United States Patent [19]

Meyer

[11] Patent Number: 4,992,060

[45] Date of Patent: Feb. 12, 1991

[54] APPARATAUS AND METHOD FOR REDUCING RADIO FREQUENCY NOISE

[75] Inventor: Dennis R. Meyer, Plymouth, Minn.

[73] Assignee: GreenTree Technologies, Inc., Plymouth, Minn.

[21] Appl. No.: 419,100

[22] Filed: Oct. 10, 1989

Related U.S. Application Data

[63] Continuation-in-part of Ser. No. 372,661, Jun. 28, 1989, abandoned.

[51] Int. Cl.[5] .......................................... H01R 13/66
[52] U.S. Cl. ...................................... 439/620; 333/12
[58] Field of Search ....................... 439/607, 610, 620; 333/12

[56] References Cited

U.S. PATENT DOCUMENTS

| | | |
|---|---|---|
| Re. 29,258 | 6/1977 | Fritz . |
| 2,594,890 | 4/1952 | Ellwood . |
| 2,865,006 | 12/1958 | Sabaroff .......................... 333/12 X |
| 3,134,950 | 5/1964 | Cook . |
| 3,243,738 | 3/1966 | Schlicke et al. . |
| 3,289,118 | 11/1966 | Garstang . |
| 3,538,464 | 11/1970 | Walsh . |
| 3,789,263 | 1/1974 | Fritz et al. . |
| 3,930,210 | 12/1975 | Hollyday . |
| 3,977,755 | 8/1976 | Edel et al. .......................... 439/610 |
| 4,506,234 | 3/1985 | Vittoria . |
| 4,592,612 | 6/1986 | Kikuta ................................. 439/610 |
| 4,679,013 | 7/1987 | Farrar et al. . |
| 4,691,208 | 9/1987 | Stern et al. . |
| 4,698,605 | 10/1987 | Imamura et al. . |
| 4,846,724 | 7/1989 | Sasaki et al. ........................ 439/610 |

Primary Examiner—Eugene F. Desmond
Attorney, Agent, or Firm—Lawrence M. Nawrocki

[57] ABSTRACT

A device for filtering radio frequency noise emanating from one or more axially extending conductors. The device includes a conductive shell which is spaced axially from the conductor or conductors. A ferrite core is fitted intermediate, and in engagement with, both the conductor or conductors and the shell. The ferrite core, thereby, functions to provide substantially increased series impedance in the conductor or conductors and to concurrently provide a common dielectric for multiple distributed, bypass capacitors along the conductor or conductors.

21 Claims, 3 Drawing Sheets

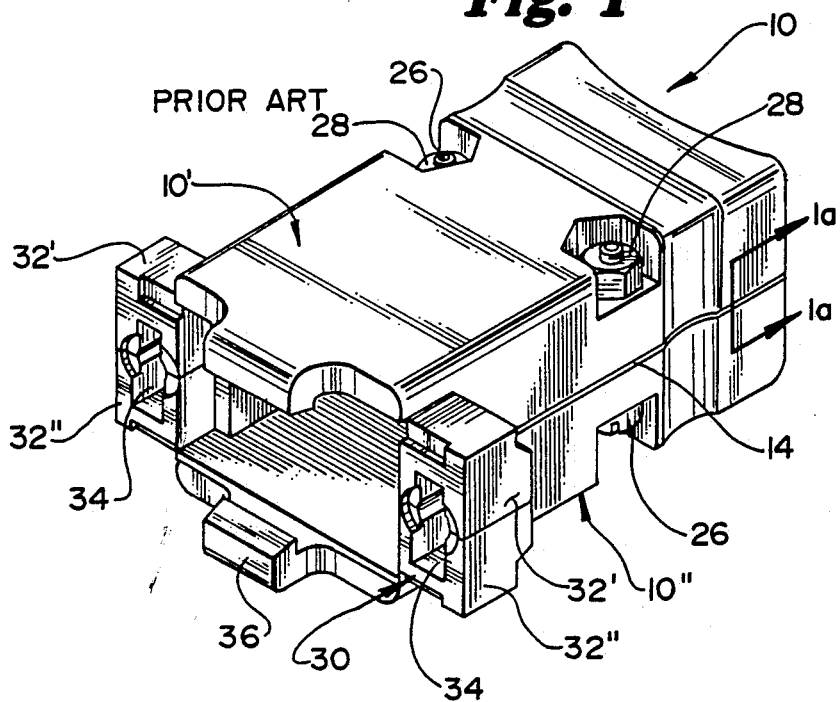
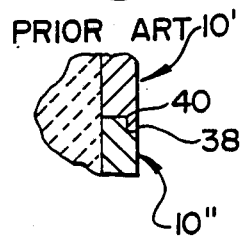
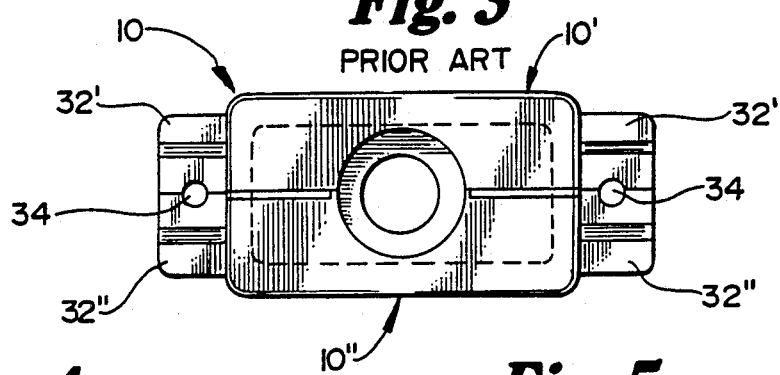
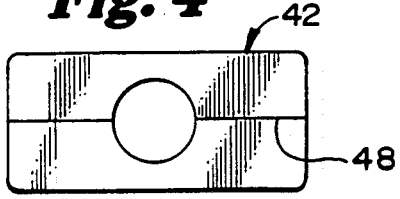
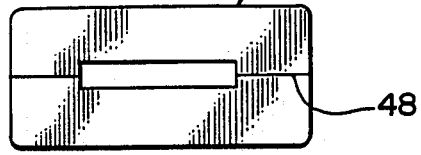

APPARATAUS AND METHOD FOR REDUCING RADIO FREQUENCY NOISE

CROSS-REFERENCE TO RELATED U.S. APPLICATION

This document is a continuation-in-part of application Ser. No. 372,661, filed June 28, 1989, now abandoned.

TECHNICAL FIELD

The present invention deals broadly with the field of electronics and electronic devices. More narrowly, however, it deals with the field of structures and methods for reducing noise emanating from transmission lines interconnecting electronic devices or connecting an electronic device to a power source. Specifically, the invention is directed to apparatus and a method for filtering a transmission line or cable at an appropriate location therealong.

BACKGROUND OF THE INVENTION

Propagation of radio frequencies is particularly desirable under some circumstances. The classic case of desirability is where a radio broadcast facility intends to transmit a radio wave into the atmosphere. In such a case, an antenna having a particular length and structure compatible with the wavelength and frequency of the waves to be transmitted is designed and constructed. The antenna is constructed specifically in order to maximize propagation of the wave.

While in the broadcasting scenario maximization of transmission is desirable, it is, at best, undesirable, and at worst, totally unacceptable, in other scenarios. The advent of the computer, including personal computers, and other equipments such as dedicated wordprocessors and electronic telephone systems has given light to circumstances where transmission of radio frequencies from transmission lines is undesirable. Power cables and transmission lines radiate radio frequencies for some distance into spaces which electronic equipments, of which the power cables and transmission lines are a part, occupy. Under some circumstances, there is no great problem because the frequencies are not radiated sufficient distances to create noise problems for other equipments. Typically, equipments in adjacent spaces are positioned so that noise problems are not made apparent.

In other circumstances, significant noise detriment can occur. This is often significantly true when an equipment generating RF noise has a power cable which plugs into a conventional wall outlet at the same location at which a wall outlet in an adjacent space is positioned. There can be a direct transmission of the noise from a generating equipment, along its power cable to its wall outlet, and directly through to the other side of the wall and into a power cable of an equipment in the adjacent space. When this occurs, a damaging effect results upon the operation of the equipment receiving the RF noise. For example, if the equipment is a computer, the effects upon operation of the computer may immediately become apparent in viewing the CRT.

There are two kinds of noise that can be generated. The first is conducted noise. Such noise is transmitted axially along the length of the transmission line. The second type is radiated noise; radiated noise emanates radially outwardly from the transmission line as would radio transmissions from, for example, a commercial radio station antenna.

While conducted noise can do much damage, it is often not as major a problem as is radiated noise. Consequently, those in the industry are, typically, not as concerned about conducted noise as they are about radiated noise. The problem can become critical, however, because conducted noise can become radiated noise if allowed to traverse cables or transmission lines.

Because of problems that have developed in the industry over the past decade or so, national agencies in various countries have implemented regulations and requirements which must be met by electronic equipments placed on the market.

Various attempts have been made to solve the problems created by conducted and radiated noise. One attempted solution has been to try to filter each individual pin of, for example, a D subminiature connector which functions to connect a data transmission line. The attempted filtering of each individual pin is, however, complex and, consequently, expensive. Even when filtering of this nature is able to be accomplished, the result is less than optimum, since such filtering does not effect filtering of noise on the cable shield.

Another attempted solution has been to place an annular ferrite sleeve over the transmission line or cable itself. Typically, however, such sleeves are brittle. Consequently, in view of their generally exposed disposition, they can become cracked, broken, and, as a result, unable to perform their intended function. Further, no magnetic shield is provided over the sleeve to eliminate magnetic interference to nearby components such as cathode ray tubes.

Additionally, when such a solution is sought, aesthetic problems result. An obtrusive appendage makes a product employing such a sleeve unsightly.

A further problem that is encountered when seeking to implement a ferrite sleeve solution is that of location. Sleeves that are affixed to a transmission line locate the sleeve some distance from the interconnecting pins thus leaving exposed or unfiltered lengths of transmission line causing radiation. Another problem encountered with the prior art is that the sleeve is often not captive but can move down the transmission line rendering it ineffective.

It is to these problems and desirable features dictated by the prior art that the present invention is directed. It is both an apparatus and method for reducing radio frequency noise emanating from a transmission line, without incurring the drawbacks of the prior art.

SUMMARY OF THE INVENTION

The present invention includes both apparatus and method embodiments. The apparatus includes a ferrite core which is received and held internally within a connector plug at at least one end of a transmission line interconnecting electronic devices. The ferrite core is disposed to surround, within the connector plug, all conductors, comprising a bundle which forms the transmission line, going to various connections of the connector plug. The core, thereby, is able to cut-off and reduce the noise immediately proximate its source.

A connector plug has an axial dimension of a certain length. In a preferred embodiment of the invention, the ferrite core is provided with an axial dimension less than that of the connector plug.

In order to facilitate positioning of the ferrite core within the connector plug and encircling a bundle comprising all conductors going to various connections of the plug and other conductors, one embodiment envisions a ferrite core which is bifurcated along a plane to divide the core into two substantially equal-in-size, generally symmetrical portions. The plane of bifurcation is such that it extends generally axially. Consequently, the bifurcated portions of the core are able to be disposed on opposite sides of the bundle of the conductors.

With the ferrite core positioned in this manner, a series inductor is created in each conductor passing through the ferrite. Additionally, a small RF bypass capacitor is created from each conductor to ground.

A cable shield and each conductor, in combination with the ferrite core and connector plug shell, function to form the capacitors. The cable shield is located outside the conductors yet within an axial channel through the ferrite core through which the conductors pass. The shield and conductors form one plate of the capacitors.

The ferrite core, having a dielectric constant of between 15 and 500,000, insulates the connector shell from the cable shield and conductors. The shell forms the other plate of the bypass capacitors.

As discussed above, the shield and conductors form one plate of the capacitors, and the other plate (the connector shell) is connected to ground. Thus, a simple integrated, distributed series of LC filters is created because of the inherent properties of the ferrite core.

The filtering of each data line is to a much lesser degree than that of the shield in view of the much smaller inner plate area. Wave shape integrity is, thereby, achieved in view of the large amount of filtering on the cable shield with only a slight amount of filtering on each data line.

It is envisioned that the ferrite core in accordance with the present invention would be produced so that its outer surface would substantially conform to an inner wall of the connector plug defining a cavity within the plug in which the core can be received. By so producing the core, it can more securely be held within the connector plug without undesired movement resulting or separation of core halves.

The apparatus invention further envisions employment of clip means for grounding any shielding and for holding the bundle comprising the conductors going to various connections of the connector plug, tightly against the inner wall of the plug. By properly providing such clip means, exact positioning of the bundle of conductors within the ferrite core can be facilitated.

The method embodiment includes steps of providing a ferrite core having an outer surface substantially conforming to an inner wall of the connector plug shell which defines a cavity therewithin, and disassembling the connector plug by separating half portions of the plug to expose the bundle of conductors within the plug. Such conductors go to the various connections of the plug. With the connector plug so disassembled, the ferrite core is seated within one of the halves of the connector plug with one side of the core received so that its outer surface is cradled by the wall of the half portion of the plug.

The bundle of individual conductors is, thereafter, passed through a central, axially-extending channel in the ferrite core. The plug is, then, reassembled by securing the two halves of the plug shell together.

The ferrite core provided as the second step of the method, can be bifurcated along a plane extending generally axially with respect to the axis of the transmission line connector plug. Insertion of the core within the plug can, thereby, be facilitated.

The present invention is thus an improved apparatus and an improved method for reducing radio frequency noise emanating from a transmission line interconnecting electronic devices. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is a perspective view of a D subminiature connector, as typically used in connecting computer components, with which the present invention is used;

FIG. 1a is a fragmentary sectional view taken generally along line 1a—1a of FIG. 1;

FIG. 3 is a rear elevational view of the connector plug shown in FIG. 1;

FIG. 4 is a rear elevational view of the core in accordance with the present invention;

FIG. 5 is a rear elevational view of an alternative core; and

DETAILED DESCRIPTION OF THE INVENTION

Figure 2:
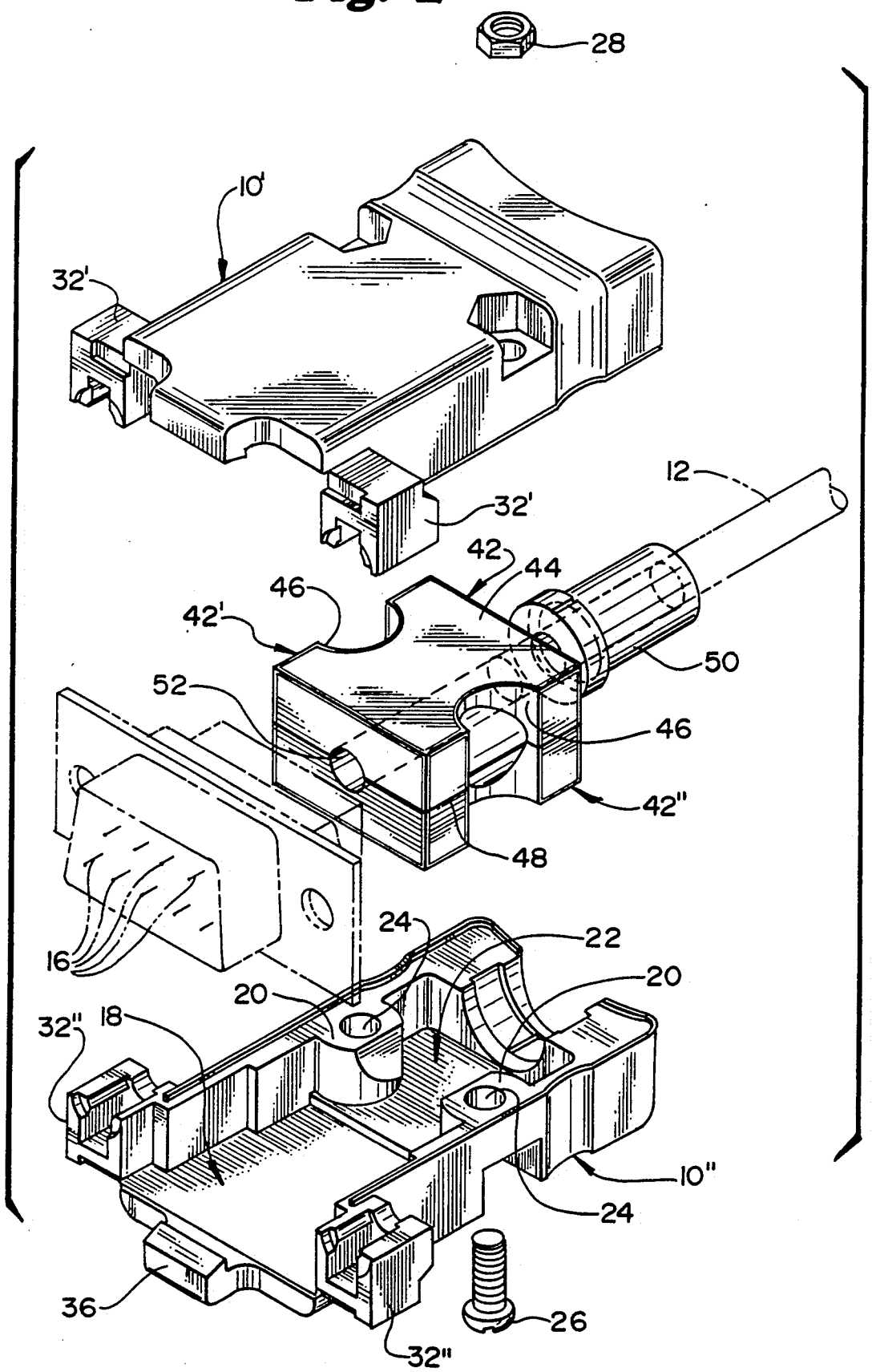
FIG. 2 is an exploded assembly view in perspective illustrating the connector shown in FIG. 1 and the core in accordance with the present invention.

Referring now to the drawings wherein like reference numerals denote like elements throughout the several views, FIG. 1 illustrates a D subminiature connector plug shell 10 as is known in the prior art. Similarly, FIG. 2 shows a similar connector in an exploded presentation to illustrate the manner of use of the present invention.

Such connector plugs are known in the prior art. They serve the purpose of mating a transmission line cable 12, typically, comprising multiple data conductors, for transmitting data from one component of a computer to another. For example, a connector might function to mate one end of the transmission line cable 12 to a central processing unit (CPU) (not shown). The other end of the transmission line cable 12 could also be provided with a similar D subminiature connector. That end of the cable 12 could be connected to, for example, a printer (not shown).

As seen in the figures, a shell defining the connector plug 10 comprises two portions 10', 10". Each portion 10', 10" is a half of the plug 10 lying on one of opposite sides of a plane of bifurcation. The plane of bifurcation extends generally axially with respect to the axis of the overall connector plug. It can be seen, with reference to FIG. 2, that the transmission line 12 can be brought into the plug 10, therefore, by separating the shell halves 10', 10".

The cable 12 comprises a plurality of conductors such as transmission wires, shielding, etc., each of the conductors going to a different one of the male pins 16 of the connector 10 and shields connected to shell ground. Such wires can be mated to their corresponding pins 16, for example, by soldering or other appropriate processes.

It will be understood that in conventional off-the-shelf connectors of the type illustrated in the figures, no filtering or inclusion of RF attenuation means is provided within the plug 10 to filter cable shields, and no ferrite capacitors are formed to provide additional filtering. While filtering of individual pins 16 has been attempted, most solutions to the noise problem typical of transmission lines 12 used with electronic equipments have focused upon the provision of a sleeve at some point along the length of the transmission line cable 12.

Figure 6:
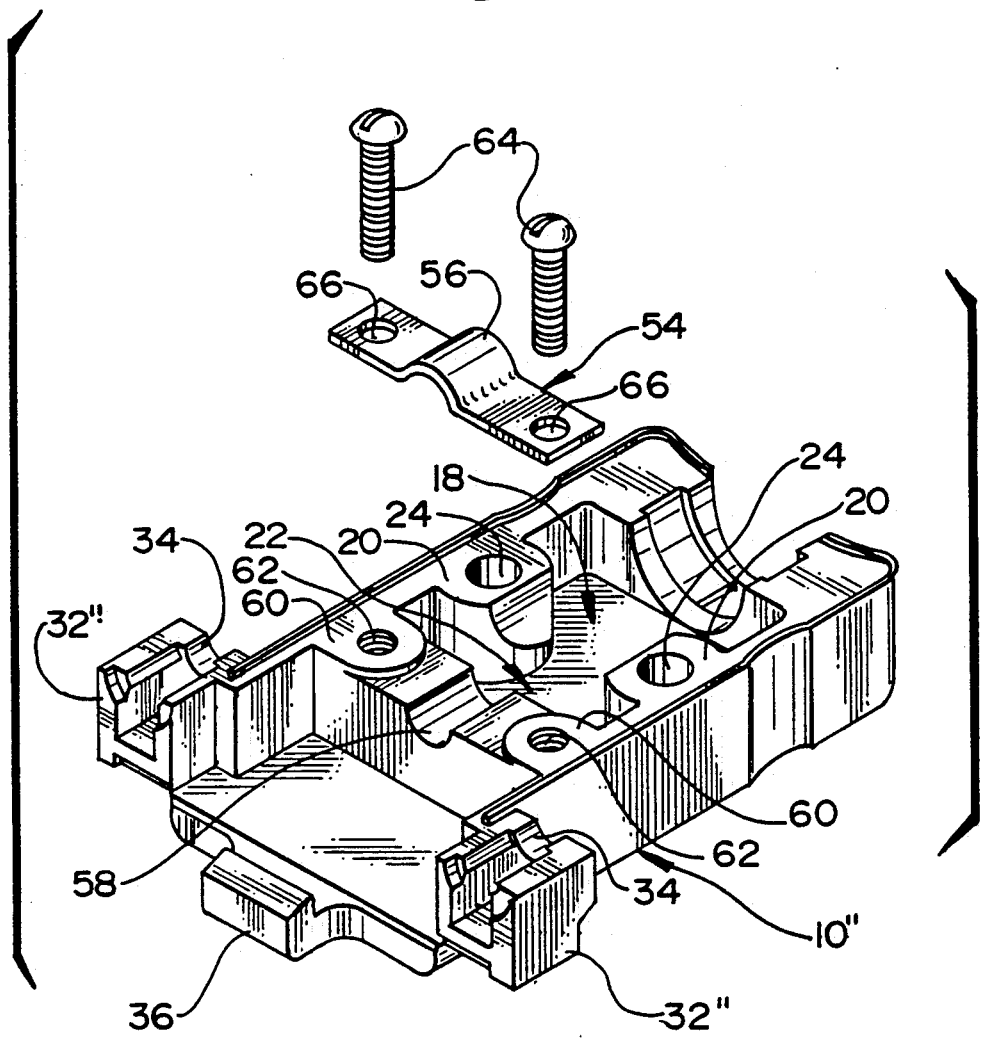
FIG. 6 is a perspective exploded view illustrating a half portion of the connector plug shell and a clip employed to ground shields and to secure a bundle comprising the conductors of the transmission line, to the half of the shell.

As previously discussed, the shell of the connector plug 10 comprises two portions 10', 10". As seen in FIGS. 2 and 6, an interior wall 18 of the lower shell half 10" is provided with contours in view of the nature of the plug 10. For example, a pair of opposed lands 20 extend inwardly into the cavity 22 defined within the shell 10, from the sides thereof. These lands 20 are provided to define apertures 24 through which bolts 26 to secure the two shell halves 10', 10" together can be disposed.

FIG. 2 shows an upper shell portion 10' which is substantially a mirror image of the lower shell portion half 10". The upper portion 10', therefore, has corresponding lands, each of the lands corresponding to a related land 20 in the lower shell portion 10". When the two shell portions 10', 10" are brought into mating engagement, apertures 24 in the related lands 20 will be in registration so that a bolt 26 can pass completely therethrough and a nut 28 be threadedly secured onto the shank portion of the two bolts 26.

At a mating end 30 of the connector plug 10, each shell portion 10', 10" is provided with a pair of appendages 32 which relate to corresponding appendages on the opposite shell portion. An axially extending hole 34 is defined in the connector 10 when the shell portions 10', 10" are mated together. These holes 34 function to receive securing screws or bolts (not shown) which allow secure retention of the connector plug 10 to the electronic equipment with which it is used.

FIGS. 1, 2, and 6 also illustrate a latch 36. Such a latch 36 serves to maintain retention of the pin housing to the connector housing.

FIG. 1a illustrates a manner in which upper and lower shell portions 10', 10" of the connector plug 10 can be fitted with respect to one another. The upper portion 10' is shown as having an outer flange tab 38 which is received in a recess 40 in the lower shell portion 10" of the shell 10. By mating the portions 10', 10" together in this manner, a seal against entry of dirt and other particulate matter into the interior of the connector plug 10 is afforded.

The present invention, as shown in FIG. 2, comprises a split ferrite core 42 which is receivable within the connector plug body 10. An outer surface 44 of the core 42, as seen in FIG. 2, is configured to substantially conform to the inner wall 18 defining a cavity 22 within the plug 10.

As previously discussed, the inner wall 18 is irregular in accommodating the lands 20 for mating, etc. The core 42 shown in FIG. 2 is produced to have side indentations 46 which conform to these lands 20.

In order to facilitate closure of the core 42 over the bundle comprising the conductors, it (the core) can be bifurcated along a central, generally axially-extending plane (as at 48). This plane, it is intended, is substantially parallel to the plane of bifurcation of the connector plug shell 10.

In view of the bifurcation of the core 42 in a manner as described, production would be such so that, when the two core portions 42', 42" are mated together, they would, aggregatedly define an outer surface 44 conforming substantially to the inner wall 18 of the connector plug 10, and inwardly the core halves would mate perfectly.

FIG. 2 illustrates a sleeve 50 which would, typically, be elastomeric in nature. The sleeve 50 can be fitted about the transmission line cable 12 at a location therealong whereby the sleeve 50 would surround the cable 12 at a location along its length which passes through a central aperture 52 in the core 42. The bundle of conductors is, thereby, protected against pinching, sharp bending, etc.

FIG. 6 shows a clip 54 which can be employed to provide cable strain relief and shield grounding. The clip 54 is shown as having a central bowed portion 56 which would pass over the bundle of conductors and shield and thus secure them to the wall 18 of the shell portion defining, in part, the cavity 22 in which the core 42 is received.

As seen in FIG. 6, the central bowed portion 56 of the clip 54 can be registered with a cradle recess 58 molded into the lower shell half 10" to accommodate passage of the bundle of conductors. Additional lands 60, having internally threaded apertures 62, can be provided in order to enable the clip 54 to be secured to the shell half 10". Appropriate screws 64 are passed through the apertures 66 in the clip 54 and into the internally threaded apertures in these lands 60.

In inserting the core 42, the connector plug 10 would be opened by removing the appropriate bolts 26 or other securing means so that the shell halves 10', 10" could be unmated. With the plug 10 opened in this manner, a first portion 42" of the ferrite core 42 would be inserted into the appropriate location within the lower connector plug half 10". This could be done by maneuvering the core half 42" until it were easily fitted into position.

The bundle of conductors would then be fed, along with the protective sleeve 50, into a position wherein the bundle were cradled in the lower half of the central aperture 52 in the core 42. The bundle, it will be understood, will extend axially through the cradle recess 58 that registers with the central, bowed portion 56 of the clip 54. The clip 54 can then be secured into place.

Thereafter, the upper half of the core 42' would be fitted over its corresponding lower half 42". With the core 42 thusly encircling the bundle of conductors, the upper portion 10' of the connector plug shell 10 would be closed over the lower portion 10" and secured in place by the bolts 26 and their associated nuts 28.

As previously suggested, the core 42 is formed from ferrite, a compound formed from a strong base and ferric oxide which exists in alkaline solution. It has been found that this particular compound is proficient in attenuating radio frequency noise first conducted and then radiated outwardly from a transmission line or cable.

With the ferrite core 42 located as discussed above, a series inductor is created in each conductor passing through the core 42. Additionally, a small RF bypass capacitor is created from each conductor to ground. The formation of the small capacitors is unique with the present invention.

A cable shield encircling the various data conductors, disposed within the central aperature 52 in the core 42, functions as one of a plurality of first plates of the various capacitors. The data conductors function as first plates of other capacitors.

The ferrite, having a dielectric constant of between 15 and 500,000 forms an excellent dielectric. The connector shell 10, enveloping the ferrite core 42, forms the other plate of each of the capacitors.

Thus, a simple, integrated distributed series of LC filters is created. This advantage is inherent in positioning the core 42 with respect to the shell 10 and shield and conductors in a manner as defined hereinbefore.

Filtering of each data line is to a lesser degree than is filtering of the shield. This is because each data line has a much smaller area than does the shield. A large amount of filtering on the cable shield and only small amounts on each data line, however, is a situation which is sought to be achieved. As a result, wave shape integrity is maintained.

It will be understood that the discussion hereinbefore is with reference to a connector shell functioning as one capacitor plate. The invention, however, does encompass numerous varied applications wherein a ferrite core 42 is enclosed by a grounded or terminated outer metallic cover, both the metallic cover and the ferrite core 42 encircling various conductors to contain unwanted RF noise.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Apparatus for reducing radio frequency noise emanating from a transmission line interconnecting electronic devices, wherein the transmission line includes a conductive connector housing at at least one end thereof, comprising:
    a ferrite core received and held within the connector housing, said ferrite core surrounding and engaging, within the connector housing, a shield surrounding all conductors passing through said ferrite core;
    wherein said ferrite core functions to provide substantially increased series impedance in said conductors and a common dielectric for multiple, distributed, bypass capacitors along said conductors.

2. Apparatus in accordance with claim 1 wherein the connector housing has an axial dimension, and wherein said ferrite core has an axial dimension less than the axial dimension of the connector housing.

3. Apparatus in accordance with claim 1 wherein said ferrite core is bifurcated along a plane to divide said core into two substantially equal-in-size, generally symmetrical portions.

4. Apparatus in accordance with claim 1 wherein the transmission line connector housing has an internal cavity defined therewithin by an internal wall of the housing, and wherein said ferrite core has an outer surface substantially conforming to the internal wall of the connector housing defining the cavity therewithin.

5. Apparatus for use with an electrically conductive connector plug at at least one end of a transmission line for interconnecting electronic devices or connecting an electronic device to a power source, said apparatus for reducing radio frequency noise which would normally emanate from, or be received by, the transmission line, comprising:
    a ferrite core, bifurcated along a plane to define two portions thereof, said core having an outer surface, when the bifurcated portions are assembled together, substantially conforming to an inner wall of the connector plug, which wall defines a cavity therewithin, so that said core is received and held within the connector plug to surround and engage a shield surrounding conductors going to various connections of the connector plug;
    wherein said ferrite core functions to provide substantially increased series impedance in the conductors and a common dielectric for multiple, distributed, bypass capacitors along the conductors.

6. Apparatus in accordance with claim 5 further comprising clamping means, securable to the inner wall of the connector plug, for holding a bundle comprising the conductors going to the various connections of the connector plug in order to facilitate alignment, strain relief, and grounding of said shield.

7. Apparatus in accordance with claim 5 wherein the connector plug has an axial dimension, and wherein said ferrite core has an axial dimension less than the axial dimension of the connector plug.

8. A method for filtering radio frequency noise emanating from a transmission line having a conductive connector housing at one end thereof by forming a plurality of distributed, bypass capacitors, comprising the steps of:
    (a) providing a ferrite core dielectric having an axially-extending channel formed therein;
    (b) disassembling the connector plug shell to expose a bundle of data conductors encircled by a shield;
    (c) feeding the bundle of shield-encircled data conductors through the axially-extending channel formed in the ferrite core; and
    (d) seating the ferrite core within the connector plug shell and reassembling the plug shell with the ferrite core in engagement with the connector plug shell and the shield-encircled data conductors;
    (e) wherein the shield and data conductors comprise, on the one hand, a first plate of various distributed, bypass capacitors, and the connector plug shell, on the other hand, comprises the second plate of the various capacitors.

9. Apparatus for filtering radio frequency interference emanating from a conductor, comprising:
    (a) a conductive connector housing spaced from the conductor; and
    (b) a ferrite core fitted intermediate, and in engagement with, the conductor and said housing;
    (c) wherein said ferrite core functions to provide substantially increased series impedance in the conductor; and
    (d) wherein said ferrite core concurrently functions to provide a common dielectric for multiple distributed, bypass capacitors along the conductor.

10. Apparatus for filtering radio frequency interference emanating from a conductor, comprising:
    (a) a conductive plug shell spaced radially from the conductor; and
    (b) a ferrite core fitted intermediate, and in engagement with, the conductor and said shell;
    (c) wherein said ferrite core functions to provide substantially increased series impedance in the conductor; and (d) wherein said ferrite core concurrently functions to provide a common dielectric for multiple distributed, bypass capacitors along the conductor.

11. Apparatus in accordance with claim 10 wherein said conductive plug shell is spaced radially outwardly from the conductor and substantially encircles the conductor, and wherein said ferrite core is in engagement with the conductor and said plug shell substantially along full circumferential surfaces of the conductor and said shell.

12. Apparatus for effecting filtering of radio frequency noise emanating from a plurality of axially extending conductors, comprising:
    (a) a conductive shell spaced axially from the conductors; and
    (b) a ferrite core fitted intermediate, and in engagement with, the conductors and said shell;
    (c) wherein said ferrite core functions to provide substantially increased series impedance in the conductors; and
    (d) wherein said ferrite core concurrently functions to provide a common dielectric for multiple distributed, bypass capacitors along the conductors.

13. Apparatus in accordance with claim 12 wherein said ferrite core is divided into portions.

14. Apparatus for attenuating the high frequency content of signals transmitted via conductor means at least partially enclosed by a conductive connector plug, comprising:
    (a) a shield made of a conducting material, surrounding the conductor means substantially along the length of the shield inside the conductor plug, forming a first member of a three-member laminar assembly within the connector plug, the connector plug forming a second member of said three-member laminar assembly; and
    (b) a ferrite core intermediate, and in engagement with, the connector plug and said shield, said ferrite core forming a third member of said three-member laminar assembly;
    (c) wherein said three-member laminar assembly utilizes dielectric and inductive properties of said ferrite core to provide a controlled low pass filter for signals transmitted via conductors of said conductor means and to provide a low impedance electrical path to radio frequency currents between said shield and the connector plug, and wherein said ferrite core functions to provide substantially increased series impedance in said shield and a common dielectric for multiple distributed, bypass capacitors along said shield.

15. Apparatus in accordance with claim 14, wherein said shield passes adjacent an inner wall defined by an aperture passing axially through said ferrite core, and wherein the connector plug engages an outer wall of said ferrite core.

16. Apparatus in accordance with claim 14 wherein said ferrite core includes a plurality of ferrite sections.

17. Apparatus in accordance with claim 14 wherein the conductor means comprises a plurality of separate conductors, and wherein said ferrite core comprises a block of ferrite having a first end and a second end, said block having an axially extending hole, extending through said block from said first end to said second end, said separate conductors passing through said hold.

18. An interference suppressing connector adapted for terminating a multiple conductor communications cable of the type having an overall longitudinal electrically conductive shield, the connector comprising:
    an electrically conductive housing adapted to be connected to an electrical ground, said housing including shield contact means positioned within the interior of said housing and adapted for establishing electrical contact between an exposed portion of said cable shield and said housing; and
    a ferrite body positioned within the interior of said housing and adjacent said shield contact means, said body having a longitudinal passageway which is adapted to receive the cable therethrough;
    wherein a cable is adapted to be positioned to extend through the ferrite body and with a portion of the cable shield in contact with said shield contact means, so that the electrically conductive housing, ferrite body and cable shield form a filter to suppress interference in the cable shield.

19. The connector of claim 18 wherein said shield contact means comprises an electrically conductive wall with an opening therein adapted to retain the cable, and wherein said conductive wall and portions of said housing define a cavity for receipt therein of said ferrite body.

20. An interference suppressing connector assembly, comprising:
    a multiple conductor communications cable having an overall longitudinal electrically conductive shield, said cable having a terminal end portion and with at least the terminal end portion of said shield being exposed;
    an electrically conductive housing adapted to be connected to an electrical ground, said housing having a generally hollow interior receiving the terminal end portion of said cable therein and including shield contact means positioned within the interior of said housing for establishing electrical contact between said exposed portion of said cable shield and said housing; and
    a ferrite body positioned within the interior of said housing and adjacent said shield contact means, with said body having a longitudinal passageway which receives said cable therethrough;
    wherein said electrically conductive housing, ferrite body, and cable shield form a filter to suppress interference in said cable shield.

21. The connector of claim 20 wherein said shield contact means comprises an electrically conductive wall with an opening therein to retain the cable, and wherein said conductive wall and portions of said housing define a cavity for receipt therein of said ferrite body.

* * * * *